HOSEA WOOD, OF EAST HENRIETTA, NEW YORK.

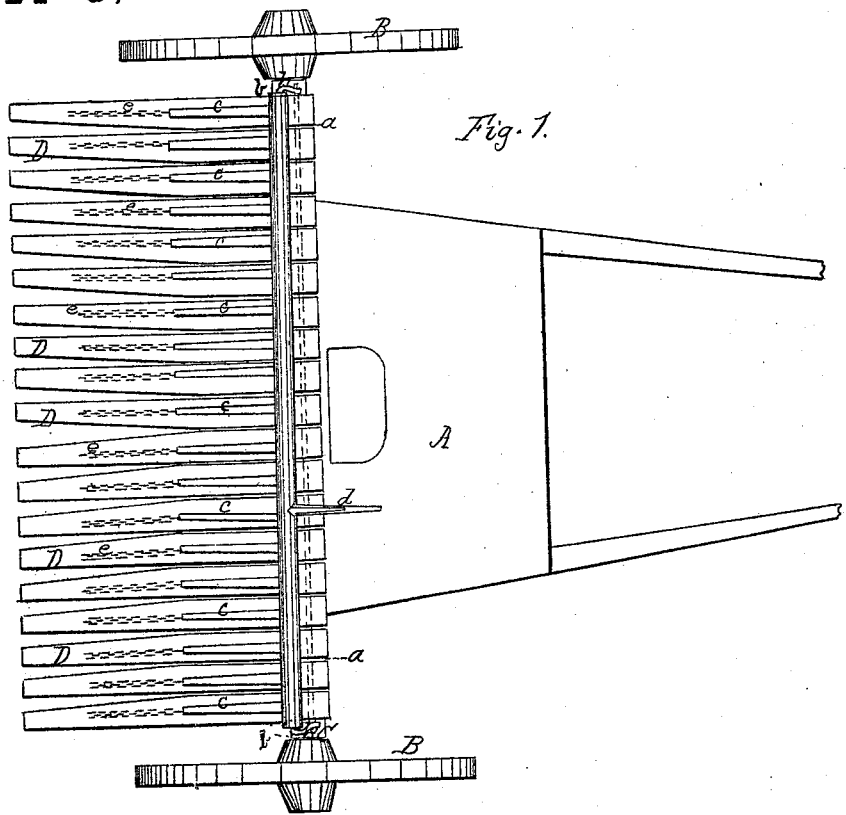
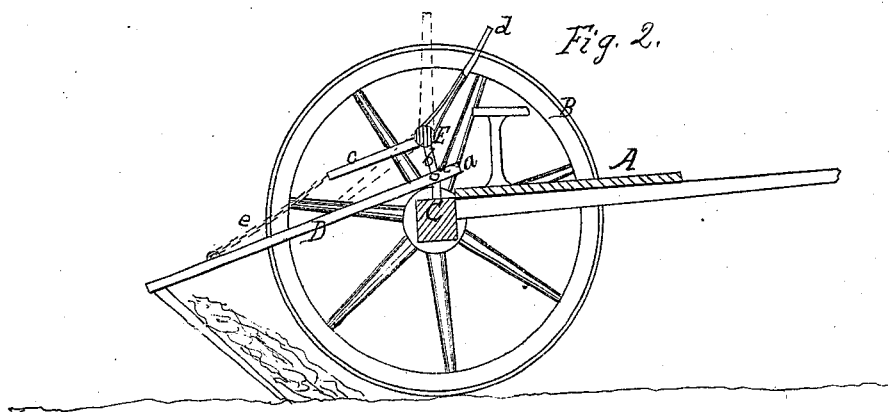

Letters Patent No. 87,315, dated February 23, 1869.

IMPROVEMENT IN HORSE-RAKES.

The Schedule referred to in these Letters Patent and making part of the same.

*To all whom it may concern:*

Be it known that I, HOSEA WOOD, of East Henrietta, in the county of Monroe, and State of New York, have invented a certain new and useful Improvement in Horse Hay-Rakes; and I do hereby declare that the following is a full and exact description thereof, reference being had to the accompanying drawings, making part of this specification, in which—

Figure 1 is a plan of my improved rake, and

Figure 2, a vertical section of the same.

Like letters of reference indicate corresponding parts in both figures.

My invention consists in so combining, with a series of independent rake-teeth, an elevated rock-shaft, with projecting pins and flexible connections, that a double effect is produced, viz, the teeth are raised in the upward action of the rock-shaft, and held down in the downward action, as hereinafter set forth.

In the accompanying drawings—

A indicates the main frame;

B B, the supporting-wheels; and

C, the axle.

The teeth D D are secured, at their front ends, to a rod, *a*, dotted lines, fig. 1, that passes through the ends of the entire series in such a manner as to allow each an independent up-and-down action.

An elevated rock-shaft, E, is made to turn in bearings *b b* at its ends, and is provided with a series of pins or arms, *c c c*, that project out in the rear, and correspond in number and position with the teeth D.

At the ends of these arms are connected chains or cords *e e e*, which are also attached to the corresponding rake-teeth.

The rock-shaft E is provided with a hand-lever, *d*, within reach of the driver, by which the shaft is turned, to raise or depress the teeth.

I am aware that rakes have already been patented in which a series of teeth, acting independently, are elevated by means of a lever-arrangement beneath.

The great objection to such devices is, that as the hay accumulates it gradually presses up on the teeth, and raises them sufficiently to allow a portion to escape, thereby making them imperfect in action, and allowing waste. It is the special object of my invention to overcome this difficulty.

The rock-shaft E not only serves to elevate the teeth D D when the arms *c c* turn upward, but it also serves to depress the teeth when the arms turn downward, and thus hold the teeth against the upward pressure of the accumulated hay.

This arrangement is also specially effective on uneven ground, where the hay is lodged in furrows and irregular places, as the downward pressure upon the teeth will force them into hollows, where their weight would not carry them down, especially under rapid motion. At the same time, the slackness of the chains *e e*, combined with the independent teeth, allows the latter to play freely and adapt themselves to all irregularities.

In no other device with which I am acquainted has the effect of both raising and depressing the teeth by the action of a simple rock-lever ever been produced. The independent teeth have been employed, but they have been elevated only by means of a cross-bar beneath, or by long connections above, that exerted a drawing-action. I do not claim any such arrangement.

What I claim as my invention, and desire to secure by Letters Patent, is—

The combination and arrangement, with the series of independent teeth D D, of the elevated rock-shaft E, provided with the pins or arms *c c* and flexible connections *e e*, whereby the double effect of elevating and depressing the teeth is produced, as herein set forth.

In witness whereof, I have hereunto signed my name, in the presence of two subscribing witnesses.

HOSEA WOOD.

Witnesses:
QUINCY VAN VOORHIS,
J. A. DAVIS.